United States Patent
Browne et al.

(10) Patent No.: US 10,860,714 B2
(45) Date of Patent: Dec. 8, 2020

(54) TECHNOLOGIES FOR CACHE SIDE CHANNEL ATTACK DETECTION AND MITIGATION

(71) Applicant: Intel Corporation, Santa Clara, CA (US)

(72) Inventors: John J. Browne, Limerick (IE); Marcel Cornu, Ennis (IE); Timothy Verrall, Pleasant Hill, CA (US); Tomasz Kantecki, Ennis (IE); Niall Power, Limerick (IE); Weigang Li, Shanghai (CN); Eoin Walsh, Shannon (IE); Maryam Tahhan, Limerick (IE)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 16/022,976

(22) Filed: Jun. 29, 2018

(65) Prior Publication Data
US 2019/0042739 A1 Feb. 7, 2019

(51) Int. Cl.
*G06F 21/55* (2013.01)
*G06F 21/56* (2013.01)

(52) U.S. Cl.
CPC .......... *G06F 21/554* (2013.01); *G06F 21/556* (2013.01); *G06F 21/568* (2013.01); *G06F 21/567* (2013.01); *G06F 2221/033* (2013.01)

(58) Field of Classification Search
CPC .... G06F 21/554; G06F 21/556; G06F 21/568; G06F 21/567; G06F 2221/033
See application file for complete search history.

(56) References Cited

U.S. PATENT DOCUMENTS

| 8,499,150 B1* | 7/2013 | Nachenberg | H04L 63/105 |
| | | | 713/158 |
| 2007/0067840 A1* | 3/2007 | Young | G06F 21/554 |
| | | | 726/22 |

(Continued)

OTHER PUBLICATIONS

Bazm et al., Cache-Based Side-Channel Attacks Detection through Intel Cache Monitoring Technology and Hardware Performance Counters, Apr. 2018, Third International Conference on Fog and Mobile Edge Computing, pp. 7-12 (Year: 2018).*

(Continued)

*Primary Examiner* — Kenneth W Chang
(74) *Attorney, Agent, or Firm* — Compass IP Law PC

(57) ABSTRACT

Technologies for cache side channel attack detection and mitigation include an analytics server and one or more monitored computing devices. The analytics server polls each computing device for analytics counter data. The computing device generates the analytics counter data using a resource manager of a processor of the computing device. The analytics counter data may include last-level cache data or memory bandwidth data. The analytics server identifies suspicious core activity based on the analytics counter data and, if identified, deploys a detection process to the computing device. The computing device executes the detection process to identify suspicious application activity. If identified, the computing device may perform one or more corrective actions. Corrective actions include limiting resource usage by a suspicious process using the resource manager of the processor. The resource manager may limit cache occupancy or memory bandwidth used by the suspicious process. Other embodiments are described and claimed.

25 Claims, 5 Drawing Sheets

(56) References Cited

U.S. PATENT DOCUMENTS

| | | | | |
|---|---|---|---|---|
| 2008/0133842 A1* | 6/2008 | Raikin | ................ | G06F 12/1491 |
| | | | | 711/145 |
| 2008/0155679 A1* | 6/2008 | Sebot | ...................... | G06F 21/74 |
| | | | | 726/16 |
| 2008/0282347 A1* | 11/2008 | Dadhia | ............... | H04L 63/1416 |
| | | | | 726/22 |
| 2009/0010424 A1* | 1/2009 | Qi | ........................ | G06F 21/572 |
| | | | | 380/28 |
| 2012/0159103 A1* | 6/2012 | Peinado | ............. | G06F 12/0831 |
| | | | | 711/163 |
| 2013/0097708 A1* | 4/2013 | Jayanthi | ................ | G06F 21/554 |
| | | | | 726/25 |
| 2014/0137131 A1* | 5/2014 | Dheap | .................... | G06F 11/34 |
| | | | | 718/104 |
| 2016/0099960 A1* | 4/2016 | Gerritz | ............... | H04L 63/1433 |
| | | | | 726/23 |

OTHER PUBLICATIONS

He et al., How secure is your cache against side-channel attacks?, Oct. 2017, 50th Annual IEEE/ACM International Symposium on Microarchitecture, pp. 341-353 (Year: 2017).*

* cited by examiner

TECHNOLOGIES FOR CACHE SIDE CHANNEL ATTACK DETECTION AND MITIGATION

BACKGROUND

Typical computer processors include one or more cache memories that may be used to increase performance Many typical computer processors also improve performance by performing speculative execution, in which the processor speculatively executes program code that may not be reached during ordinary program execution. Malicious software may exploit one or more cache side channel attacks, such as cache timing attacks, in combination with carefully controlled speculative execution in order to circumvent processor access controls and read the contents of restricted memory locations. For example, many current processors may be vulnerable to related families of exploits known as Meltdown and Spectre. Vulnerabilities such as Meltdown and Spectre may be avoided by updating operating system code and/or processor microcode for each affected computing platform. However, certain countermeasures to those vulnerabilities may negatively impact performance for certain workloads.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
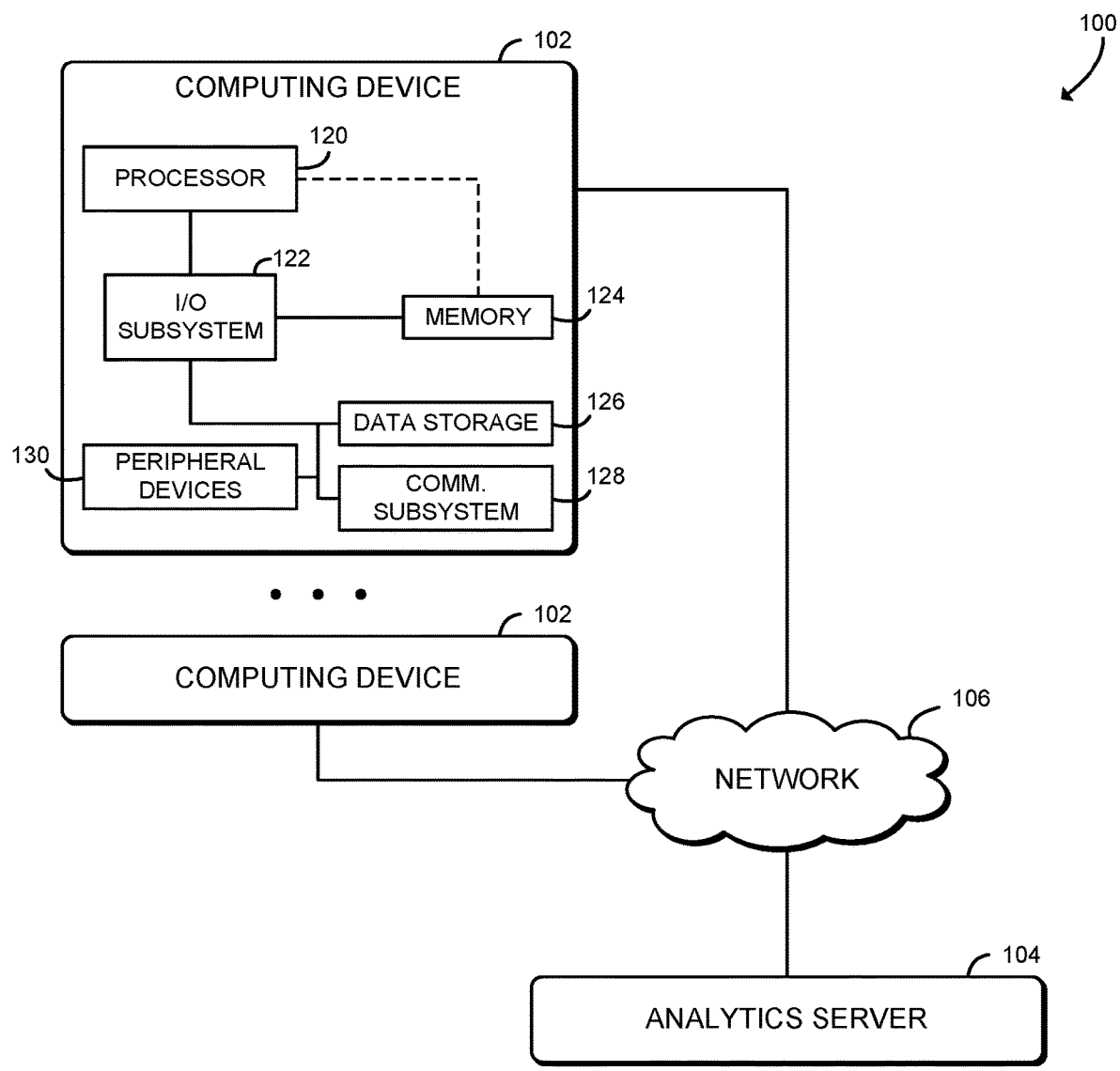
FIG. 1 is a simplified block diagram of at least one embodiment of a system for a cache side channel attack detection and mitigation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for cache side channel attack detection and mitigation includes multiple computing devices 102 in communication with an analytics server 104 over a network 106. In use, as described further below, the analytics server 104 polls each computing device 102 for resource usage data collected by a hardware resource manager of the computing device, such as Intel® Resource Director Technology (RDT). Based on the resource usage data, the analytics server 104 determines whether a suspicious level of processor core activity indicative of a potential cache side channel attack exists. If so, the analytics server 104 causes the computing device 102 to execute a detection process that identifies suspicious application activity, for example by monitoring cache miss performance counters. If suspicious application activity is found, the system 100 may perform corrective actions, such as restricting resource usage by a suspicious process using the hardware resource manager of the computing device 102. Thus, the system 100 may detect and mitigate cache side channel attacks. Additionally, the system 100 may perform cache side channel attack detection and mitigation without requiring updates to operating system code and/or or processor microcode. Thus, the system 100 may scale to large numbers of monitored computing devices 102, including large numbers of devices 102 that are not updated (or cannot be updated). Additionally, by performing core activity analysis on the analytics server 104 (which may already collect and analyze resource usage data for other purposes), the system 100 may reduce or eliminate detection overhead for each computing device 102 for cache side channel attacks. Further, by using the hardware resource manager to limit resource usage by a malicious process, the system 100 may prevent the disclosure of unauthorized data, even on unpatched computing devices 102.

Each computing device 102 may be embodied as any type of computation or computer device capable of performing the functions described herein, including, without limitation, a computer, a server, a rack-based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 122, a memory 124, a data storage device 126, and a communication subsystem 128, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

Figure 2:
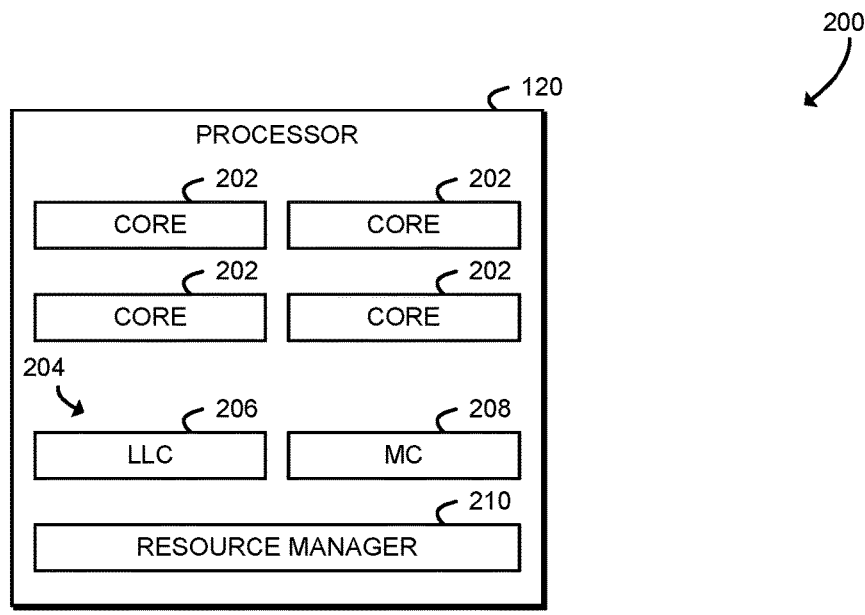
FIG. 2 is a simplified block diagram of at least one embodiment of a multi-core processor of a computing device of the system of FIG. 1.

The processor 120 may be embodied as any type of processor capable of performing the functions described herein. The processor 120 may be embodied as a single or multi-core processor(s), digital signal processor, microcontroller, or other processor or processing/controlling circuit. The processor 120 includes a hardware resource manager such as Intel RDT. One potential embodiment of the processor 120 is illustrated in FIG. 2 and described further below. Additionally or alternatively, although illustrated as including a single processor 120, it should be understood that in some embodiments, the computing device 102 may include multiple processors 120. For example, the computing device 102 may be embodied as a multi-socket server device that provides services to one or more client devices. The computing device 102 may be included in a server rack or other data center environment.

The memory 124 may be embodied as any type of volatile or non-volatile memory or data storage capable of performing the functions described herein. In operation, the memory 124 may store various data and software used during operation of the computing device 102, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any network interface controller or other communication circuit, device, or collection thereof, capable of enabling communications between the computing device 102 and other remote devices over a network. The communication subsystem 128 may be configured to use any one or more communication technology (e.g., wired or wireless communications) and associated protocols (e.g., Ethernet, Infini-Band®, Bluetooth®, Wi-Fi®, WiMAX, etc.) to effect such communication.

As shown, the computing device 102 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

The analytics server 104 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As such, the analytics server 104 may include components and features similar to the computing device 102, such as a processor 120, I/O subsystem 122, memory 124, data storage 126, communication subsystem 128, and various peripheral devices 130. Those individual components of the analytics server 104 may be similar to the corresponding components of the computing device 102, the description of which is applicable to the corresponding components of the analytics server 104 and is not repeated for clarity of the present description.

As discussed in more detail below, the computing devices 102 and the analytics server 104 may be configured to transmit and receive data with each other and/or other devices of the system 100 over the network 106. The network 106 may be embodied as any number of various wired and/or wireless networks. For example, the network 106 may be embodied as, or otherwise include a wired or wireless local area network (LAN), and/or a wired or wireless wide area network (WAN). As such, the network 106 may include any number of additional devices, such as additional computers, routers, and switches, to facilitate communications among the devices of the system 100. In the illustrative embodiment, the network 106 is embodied as a local Ethernet network.

Referring now to FIG. 2, diagram 200 illustrates one potential embodiment of the processor 120 of the computing device 102. The processor 120 is illustratively embodied as a multi-core processor that includes four processor cores 202. Each processor core 202 may be embodied as an independent, general purpose processing unit capable of executing programmed instructions. Each processor core 202 may support simultaneous multithreading, hyperthreading, or otherwise include multiple hardware threads and/or logical processors. Each processor core 202 may also include one or more performance counters, performance monitoring units, or other devices capable of recording and monitoring the flow of instructions through the respective processor core 202, for example by counting clock cycles, instructions issued, instructions retired, cache loads, cache misses, or other events.

The processor 120 also includes an uncore 204, which includes any part of the processor 120 not included in the processor cores 202 (e.g., all components of the processor 120 except for the processor cores 202 themselves). Illustratively, the uncore 204 includes a last-level cache (LLC) 206, an integrated memory controller (MC) 208, and a resource manager 210. Additionally, although not illustrated, the uncore 204 may also include typical components of a processor or a system-on-a-chip, such as processor graphics, input/output controllers, power management circuitry, or other components of the processor 120.

The LLC 206 may be embodied as a cache memory shared by all of the processor cores 202. The computing device 102 and the processor 120 may include multiple levels of cache memory. Cache memory is generally smaller, faster, and closer to the processor core 202 than main memory (e.g., the memory 124). Each physical processor core 202 may include one or more dedicated cache memories. For example, each processor core 202 may include separate level one (L1) caches for instructions and data and a unified level 2 (L2) cache. Illustratively, the processor cores 202 share a level 3 (L3) cache, which is the LLC 206. If certain data (e.g., instructions or data) are not included in the cache hierarchy, the processor core 202 accesses that data in the memory 124. The MC 208 may be embodied as a controller circuit or other logic that interfaces the processor 120 and the memory 124.

The resource manager 210 may be embodied as any controller or other digital logic that allows monitoring and controlling resource usage by the processor 120. Illustratively, the resource manager 210 is embodied as Intel Resource Director Technology (RDT). Intel RDT is a hardware-based resource manager that supports monitoring and allocating shared resources of a computing device such as cache and bandwidth. In particular, Intel RDT may include cache monitoring technology (CMT), cache allocation technology (CAT), memory bandwidth monitoring (MBM), and other monitoring or allocation features. The resource manager 210 may allow monitoring LLC 206 cache misses, LLC 206 cache occupancy, memory bandwidth usage, or other resource usage by the processor 120. The resource manager 210 may also enforce limits on LLC 206 cache occupancy, memory bandwidth usage, or other resource usage. The resource manager 210 may monitor and/or enforce resource usage for the entire processor 120, for individual processes executed by the processor 120, and/or for groups of processes.

Figure 3:
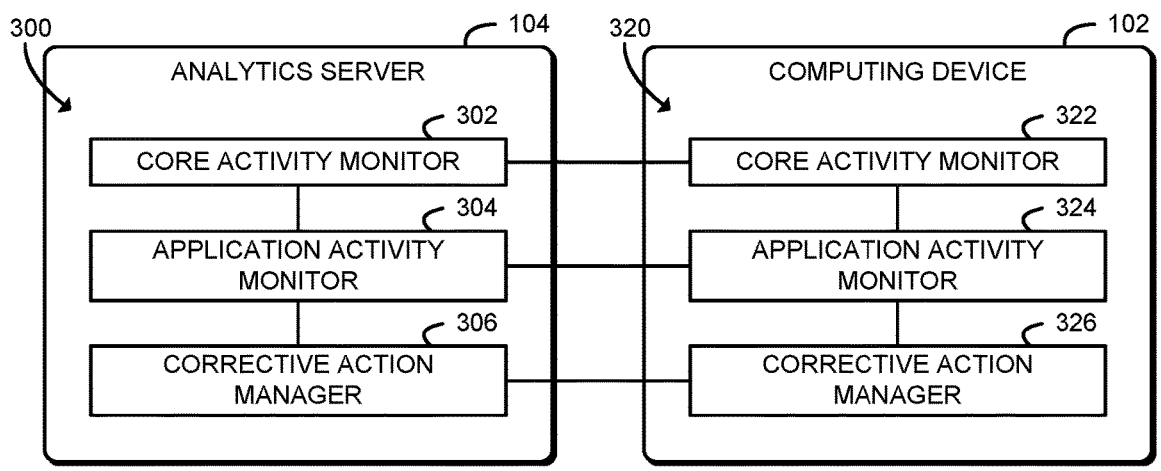
FIG. 3 is a simplified block diagram of at least one embodiment of various environments that may be established by the system of FIGS. 1-2.

Referring now to FIG. 3, in an illustrative embodiment, the analytics server 104 establishes an environment 300 during operation. The illustrative environment 300 includes a core activity monitor 302, an application activity monitor 304, and a corrective action manager 306. The various components of the environment 300 may be embodied as hardware, firmware, software, or a combination thereof. As such, in some embodiments, one or more of the components of the environment 300 may be embodied as circuitry or collection of electrical devices (e.g., core activity monitor circuitry 302, application activity monitor circuitry 304, and/or corrective action manager circuitry 306). It should be appreciated that, in such embodiments, one or more of the core activity monitor circuitry 302, application activity monitor circuitry 304, and/or corrective action manager circuitry 306 may form a portion of one or more of the processor, the I/O subsystem, the communication subsystem, and/or other components of the analytics server 104. Additionally, in some embodiments, one or more of the illustrative components may form a portion of another component and/or one or more of the illustrative components may be independent of one another.

The core activity monitor 302 is configured to receive activity counter data from a monitored computing device 102, such as LLC 206 data, memory bandwidth data, or other activity data from the resource manager 210 of the computing device 102. The core activity monitor 302 is further configured to determine whether suspicious core activity exists based on the activity counter data. Suspicious core activity is indicative of a cache side channel attack. Suspicious core activity may be identified by comparing cache misses or memory bandwidth usage of the activity counter data to predetermined thresholds. In some embodiments, the core activity monitor 302 is configured to receive activity counter data for one or more primary applications of the computing device 102. Suspicious core activity may be identified by comparing the activity counter data for the primary applications to activity counter data for all applications of the computing device 102. In some embodiments, the core activity monitor 302 may be further configured to poll the computing device 102 for the activity counter data at a predetermined monitoring interval. The core activity monitor 302 may be further configured to select a computing device 102 for monitoring from multiple computing devices 102.

The application activity monitor 304 is configured to deploy a detection process to the monitored computing device 102 or otherwise cause the monitored computing device 102 to execute the detection process in response to determining that suspicious core activity exists. The application activity monitor 304 is further configured to determine whether a suspicious application exists in response to deploying the detection process. The suspicious application is also indicative of the cache side channel attack. In some embodiments, the application activity monitor 304 may be further configured to determine whether the suspicious application is included in a predetermined list of allowed applications (i.e., a whitelist).

The corrective action manager 306 is configured to cause the monitored computing device 102 to perform one or more corrective actions in response to identifying a suspicious application exists. The corrective action may include killing the suspicious application, deleting an image associated with the suspicious application, or resetting the monitored computing device 102. In some embodiments, the corrective action may include to restricting resource usage by the suspicious application using the resource manager 210 of the managed computing device 102. Restricting the resource usage may include restricting cache occupancy or memory bandwidth available to the suspicious application. The corrective action manager 306 may cause the monitored computing device 102 to perform the corrective action if the suspicious application is not included in the allowed application whitelist.

Still referring to FIG. 3, in an illustrative embodiment, the computing device 102 establishes an environment 320 during operation. The illustrative environment 320 includes a core activity monitor 322, an application activity monitor 324, and a corrective action manager 326. The various components of the environment 320 may be embodied as hardware, firmware, software, or a combination thereof. As such, in some embodiments, one or more of the components of the environment 320 may be embodied as circuitry or collection of electrical devices (e.g., core activity monitor circuitry 322, application activity monitor circuitry 324, and/or corrective action manager circuitry 326). It should be appreciated that, in such embodiments, one or more of the core activity monitor circuitry 322, the application activity monitor circuitry 324, and/or the corrective action manager circuitry 326 may form a portion of one or more of the processor 120, the I/O subsystem 122, the communication subsystem 128, and/or other components of the computing device 102. Additionally, in some embodiments, one or more of the illustrative components may form a portion of another component and/or one or more of the illustrative components may be independent of one another.

The core activity monitor 322 is configured to send activity counter data to the analytics server 104. The activity counter data is generated by the resource manager 210 of the processor 120 of the computing device 102. In some embodiments, the core activity monitor 322 may be configured to send activity counter data for one or more primary applications of the computing device 102 as well as activity counter data for the entire computing device 102. The activity counter data may include LLC 206 data or memory bandwidth data generated by the resource manager 210.

The application activity monitor 324 is configured to determine whether suspicious application activity exists based on performance counter data of the computing device 102 in response sending the activity data to the analytics server 104. The suspicious application activity is indicative of a cache side channel attack. Determining whether the suspicious application activity exists may include sampling LLC 206 loads and LLC 206 load misses for each logical processor of the processor 120 using the performance counters, determining a ratio of LLC load misses to LLC loads, and comparing that ratio to a predetermined threshold ratio. Determining whether the suspicious application activity exists may include executing a detection process to identify the suspicious application activity. The detection process may be received or otherwise deployed from the analytics server 104 in response to sending the activity counter data. The application activity monitor 324 may be further configured to report whether the suspicious application activity exists to the analytics server 104.

The corrective action manager 326 is configured to perform a corrective action in response to determining that the suspicious application activity exists. The corrective action may include killing a process associated with the suspicious application activity, deleting an image associated with the suspicious application activity, or resetting the computing device 102. In some embodiments, the corrective action may include restricting resource usage by a process associated with the suspicious application activity using the resource manager 210. Restricting the resource usage may include restricting cache occupancy or memory bandwidth available to the process associated with the suspicious application activity.

Additionally, although illustrated in FIG. 3 as being established by a separate analytics server 104 and computing devices 102, it should be understood that in some embodiments the environments 300, 320 may be co-located in a single computing device. In those embodiments, a single device may perform the functions of both the analytics server 104 and the computing device 102, for example by executing multiple virtual machines or otherwise performing both functions. A virtual machine (VM) may include a partially or completely emulated computer system, including a guest operating system and one or more network queues. The VM may be executed using virtualization hardware support of the computing devices 102, 104, including virtualized I/O support of the processor 120. In that example, the analytics server 104 may monitor a single computing device 102 (i.e., the co-located computing device 102).

Figure 4:
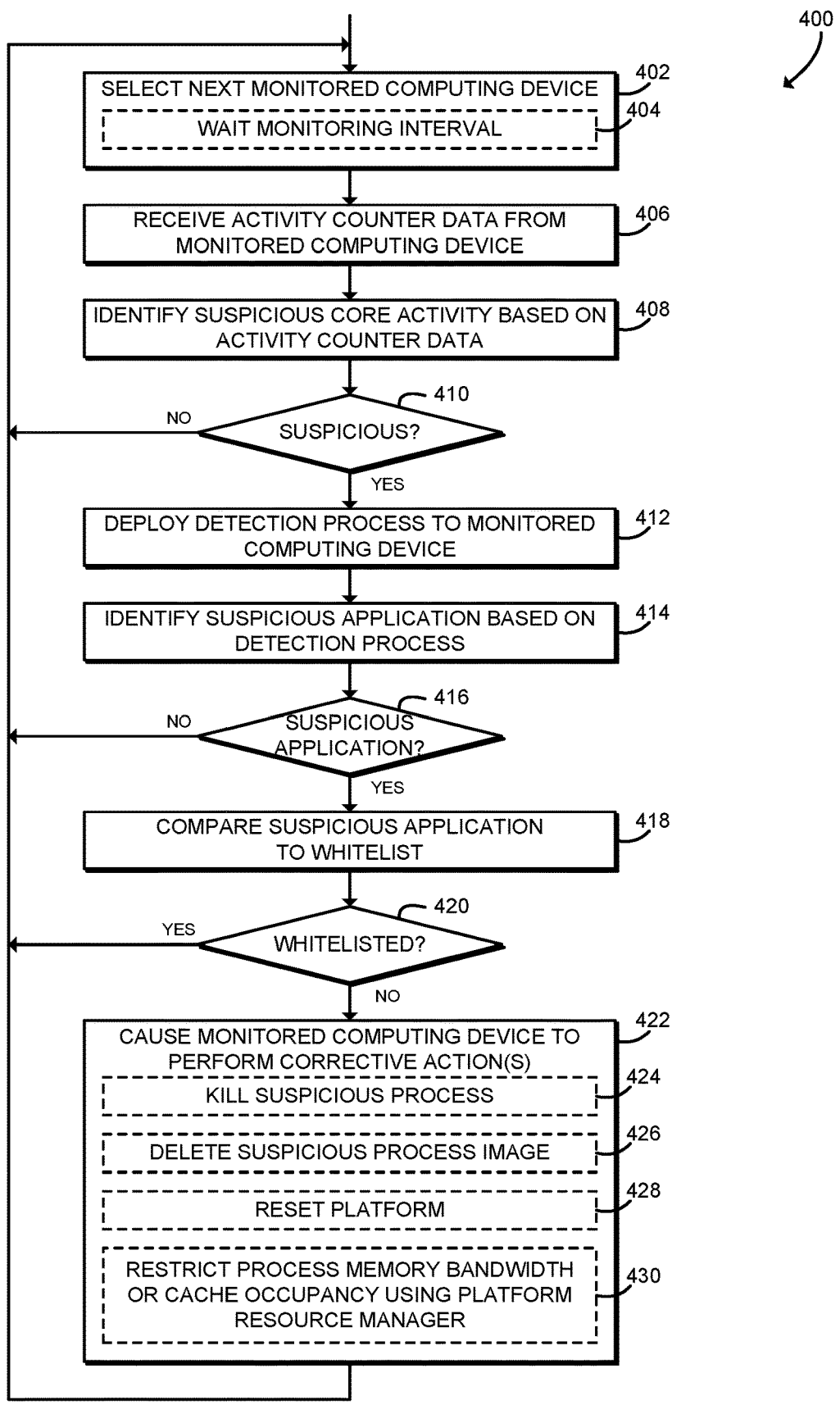
FIG. 4 is a simplified flow diagram of at least one embodiment of a method for cache side channel attack detection and mitigation that may be performed by an analytics server of FIGS. 1-3.

Referring now to FIG. 4, in use, the analytics server 104 may execute a method 400 for cache side channel attack detection and mitigation. It should be appreciated that, in some embodiments, the operations of the method 400 may be performed by one or more components of the environment 300 of the analytics server 104 as shown in FIG. 3. The method 400 begins in block 402, in which the analytics server 104 selects a monitored computing device 102 for analysis. The analytics server 104 may monitor multiple computing devices 102, which may be located together in a common location and/or network, or distributed. For example, the analytics server 104 may be embodied as or otherwise included in an orchestration node of a cloud computing infrastructure that includes the computing devices 102. The analytics server 104 may use any predetermined schedule, monitoring policy, or other selection algorithm to select a computing device 102 for monitoring. For example, the analytics server 104 may perform cache side channel attack detection and mitigation at the same time that the analytics server 104 performs other routine analytics monitoring tasks. In some embodiments, in block 404 the analytics server 104 may wait for a predetermined monitoring interval. For example, the analytics server 104 may poll each computing device 102 every fifteen minutes for analytics data.

In block 406, the analytics server 104 receives analytics counter data from the monitored computing device 102. The analytics counter data may be embodied as any performance monitoring or resource management counter data that may be indicative of an active cache side channel attack. For example, the analytics counter data may be indicative of last-level cache (LLC) 206 occupancy, LLC 206 cache misses, memory bandwidth used, or other performance characteristics. The analytics counter data may be generated by the resource manager 210 of the computing device 102 or, in some embodiments, performance counters of individual processor cores 202 of the computing device 102. The analytics counter data may be collected and/or reported by one or more standard analytics packages of the computing device 102, and thus may not require execution of a specialized software process by each computing device 102. The analytics counter data may be applicable to all processes executed by the computing device 102, or in some embodiments may be limited to a particular subset of processes executed by the computing device 102. Methods for receiving particular activity counter data are described further below in connection with FIGS. 5 and 6.

In block 408, the analytics server 104 identifies suspicious core activity based on the activity counter data. Suspicious core activity is indicative of an active cache side channel attack and may include abnormal levels of LLC 206 occupancy, LLC 206 misses, memory bandwidth consumed, or other abnormal resource usage. Methods for identifying suspicious core activity are described further below in connection with FIGS. 5 and 6. In block 410, the analytics server 104 determines whether suspicious core activity has been identified. If not, the method 400 loops back to block 402 to continue monitoring computing devices 102. If suspicious core activity is detected, the method 400 advances to block 412.

In block 412, the analytics server 104 deploys a detection process to the monitored computing device 102. The detection process may be embodied as a specialized software process or other process that monitors for suspicious application activity indicative of a cache side channel attack. The analytics server 104 may transmit the detection process to the computing device 102 or otherwise cause the computing device 102 to execute the detection process. In block 414, the analytics server 104 identifies suspicious application activity based on the detection process. For example, the computing device 102 may report whether suspicious application activity was detected and/or the computing device 102 may report data generated by the detection process and the analytics server 104 may identify suspicious application activity based on that data. Methods for identifying suspicious application activity are described further below in connection with FIG. 7. In block 416, the analytics server 104 determines whether suspicious application activity has been identified. If not, the method 400 loops back to block 402 to continue monitoring computing devices 102. If suspicious application activity is detected, the method 400 advances to block 418.

In block 418, the analytics server 104 compares the suspicious application to a whitelist, which may be embodied as a list of allowed applications. For example, the analytics server 104 may compare a name, signature, or other identifier associated with the suspicious application activity to a database of known-good applications. In block 420 the analytics server 104 determines whether the suspicious application is included in the whitelist. If so, the method 400 loops back to block 402 to continue monitoring computing devices 102. If the suspicious application is not whitelisted, the method 400 advances to block 422.

In block 422, the analytics server 104 causes the monitored computing device 102 to perform one or more corrective actions to mitigate a potential cache side channel attack. For example, the analytics server 104 may send a command to a virtual machine monitor, operating system, or other control software of the computing device 102 to perform the requested corrective action. The particular corrective action requested may depend on one or more capabilities of the computing device 102, one or more security policies, or other factors.

In block 424, in some embodiments the computing device 102 may kill a process associated with the suspicious application or otherwise terminate a currently executing suspicious application. In block 426, in some embodiments the computing device 102 may delete an executable image or other files associated with the suspicious application. In block 428, in some embodiments the computing device 102 may reset, reboot, or otherwise restart. Resetting the computing device 102 may cause the caches and other volatile memory of the computing device 102 to be reset and thus may defeat certain cache side channel attacks. In some embodiments, in block 430 the computing device 102 may restrict resource usage such as memory bandwidth or LLC 206 occupancy for a process associated with the suspicious application using the resource manager 210 of the computing device 102. Restricting resource usage may prevent or reduce the severity of certain cache side-channel attacks, for example by preventing the malicious process from forcing the LLC 206 to be flushed and/or by reducing the rate that a malicious process can attempt to read unauthorized memory.

As described above, in some embodiments multiple corrective actions may be combined. For example, in some embodiments a process associated with the suspicious application is killed, an image associated with the suspicious application is deleted, and the platform is reset. As another example, in the case that the platform is running critical processes and cannot be reset at that time, the corrective actions may include restricting cache usage of the suspected malicious process until critical processes are migrated or suspended. After the critical processes are migrated or suspended, the suspicious process may be killed, the image deleted, and the platform reset. In that example, the computing device 102 may be marked by an orchestration system as requiring a special behavior to be performed after the malicious process is detected and its cache access is reduced. After causing the computing device 102 to perform the corrective action, the method 400 loops back to block 402 to continue monitoring computing devices 102.

Figure 5:
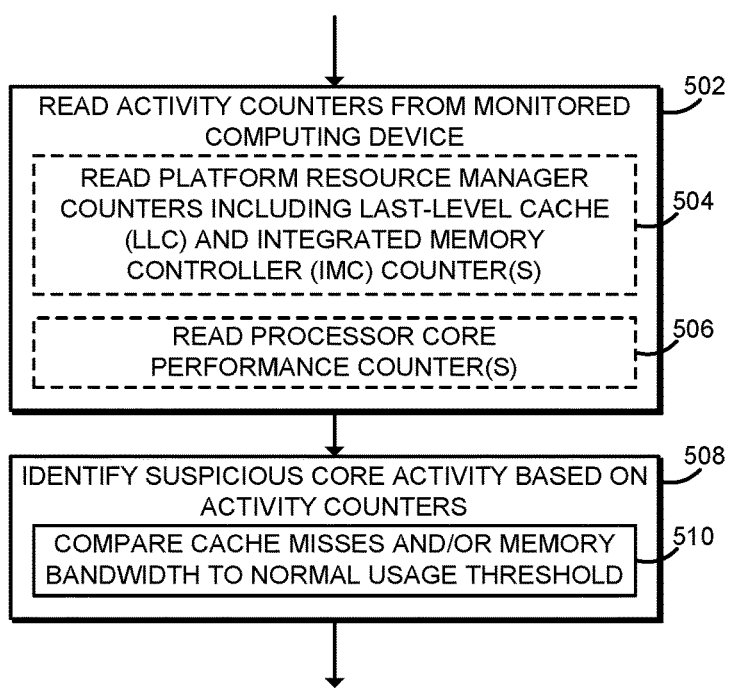
FIG. 5 is a simplified flow diagram of at least one embodiment of a method for suspicious core activity detection that may be performed by the analytics server of FIGS. 1-3.

Referring now to FIG. 5, in use, the analytics server 104 may execute a method 500 for suspicious core activity detection. The method 500 may be executed, for example, in connection with blocks 406 and 408 as described above in connection with FIG. 4. It should be appreciated that, in some embodiments, the operations of the method 500 may be performed by one or more components of the environment 300 of the analytics server 104 as shown in FIG. 3. The method 500 begins in block 502, in which the analytics server 104 reads analytics counter data from the monitored computing device 102. As described above, the analytics counter data may be embodied as any performance monitoring or resource management counter data that may be indicative of an active cache side channel attack. Illustratively, the analytics counter data is indicative of performance and/or resource usage by all processes executed by the computing device 102. In some embodiments, in block 504 the analytics server 104 reads platform resource manager 210 performance counters including LLC 206 counters and integrated memory controller 208 counters. The platform resource manager 210 counters may be indicative of, for example, cache occupancy in the LLC 206 and memory bandwidth used. In some embodiments, in block 506 the analytics server 104 reads one or more processor core 202 performance counters. The processor core 202 performance counters may be indicative of LLC loads and LLC misses executed by each processor core 202.

In block 508, the analytics server 104 identifies suspicious core activity based on the activity counter data. As described above, suspicious core activity is indicative of a cache side channel attack and may include abnormal levels of LLC 206 occupancy, LLC 206 misses, memory bandwidth consumed, or other abnormal resource usage. In block 510 the analytics server 104 compares cache misses from the activity counter data to a normal usage threshold for cache misses and/or compares memory bandwidth from the activity counter data to a normal usage threshold for memory bandwidth. The normal usage thresholds may be determined based on a typical workload for the computing device 102 or other predetermined threshold. After identifying suspicious core activity, the method 500 is completed. As described above in connection with FIG. 4, if suspicious core activity is identified, the analytics server 104 may cause the computing device 102 to perform additional monitoring to identify suspicious application activity.

Figure 6:
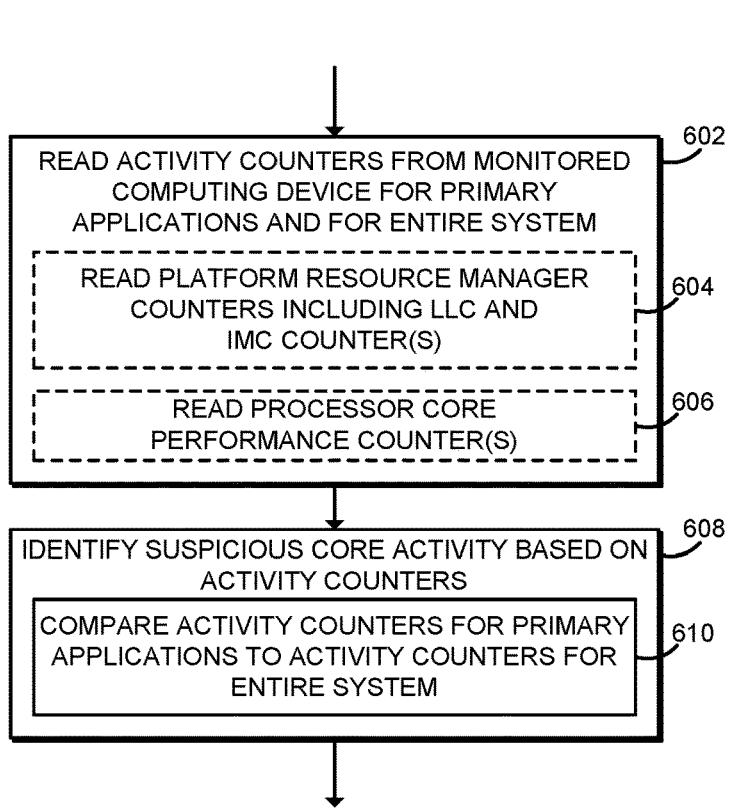
FIG. 6 is a simplified flow diagram of at least one embodiment of another method for suspicious core activity detection that may be performed by the analytics server of FIGS. 1-3.

Referring now to FIG. 6, in use, the analytics server 104 may execute a method 600 for suspicious core activity detection. The method 600 may be executed, for example, in connection with blocks 406 and 408 as described above in connection with FIG. 4. It should be appreciated that, in some embodiments, the operations of the method 600 may be performed by one or more components of the environment 300 of the analytics server 104 as shown in FIG. 3. The method 600 begins in block 602, in which the analytics server 104 reads analytics counter data from the monitored computing device 102 for a group of primary applications and for the entire computing device 102. The primary applications may be embodied as a group of processes, servers, or other applications that are expected to be executed by the computing device 102 and are known to be non-malicious. For example, the primary applications may include a web server, database server, and other supporting processes executed by the computing device 102. The resource manager 210 of the computing device 102 may provide analytics counter data for the primary applications and for all applications executed by the computing device 102; thus, monitoring the behavior of the primary applications may not adversely impact performance of the computing device 102.

As described above, the analytics counter data may be embodied as any performance monitoring or resource management counter data that may be indicative of an active cache side channel attack. In some embodiments, in block 604 the analytics server 104 reads platform resource manager 210 performance counters including LLC 206 counters and integrated memory controller 208 counters. The platform resource manager 210 counters may be indicative of, for example, cache occupancy in the LLC 206 and memory bandwidth used. As described above, the resource manager 210 may provide LLC 206 and memory bandwidth data for the primary applications as well as for all processes executed by the computing device 102. In some embodiments, in block 506 the analytics server 104 reads one or more processor core 202 performance counters. The processor core 202 performance counters may be indicative of LLC loads and LLC misses executed by each processor core 202.

In block 608, the analytics server 104 identifies suspicious core activity based on the activity counter data. As described above, suspicious core activity is indicative of a cache side channel attack and may include abnormal levels of LLC 206 occupancy, LLC 206 misses, memory bandwidth consumed, or other abnormal resource usage. In block 610, the analytics server 104 compares activity counters for the primary applications to activity counters for all processes executed by the computing device 102. Increased resource usage (e.g., increased LLC 206 occupancy, memory bandwidth, and/or LLC 206 cache misses) for the entire computing device 102 while resource usage for the primary applications does not increase may indicate the presence of a cache side channel attack. After identifying suspicious core activity, the method 600 is completed. As described above in connection with FIG. 4, if suspicious core activity is identified, the analytics server 104 may cause the computing device 102 to perform additional monitoring to identify suspicious application activity.

It should be appreciated that, in some embodiments, the methods 400, 500, and/or 600 may be embodied as various instructions stored on a computer-readable media, which may be executed by the processor, the I/O subsystem, and/or other components of the analytics server 104 to cause the analytics server 104 to perform the respective method 400, 500, and/or 600. The computer-readable media may be embodied as any type of media capable of being read by the analytics server 104 including, but not limited to, the memory, the data storage device, firmware devices, and/or other media.

Figure 7:
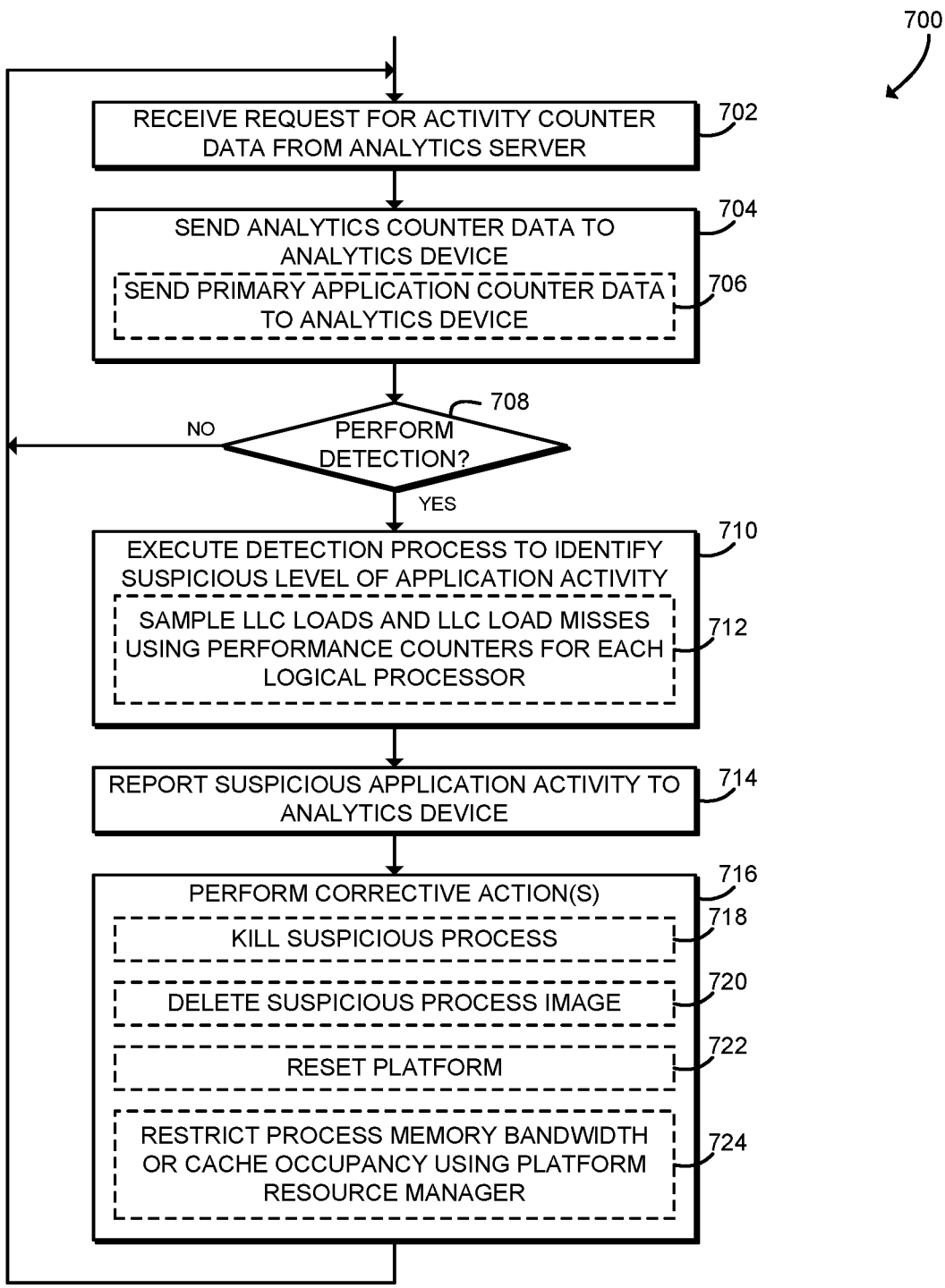
FIG. 7 is a simplified flow diagram of at least one embodiment of a method for cache side channel attack detection and mitigation that may be performed by a monitored computing device of FIGS. 1-3.

Referring now to FIG. 7, in use, the computing device 102 may execute a method 700 for cache side channel attack detection and mitigation. It should be appreciated that, in some embodiments, the operations of the method 700 may be performed by one or more components of the environment 320 of the computing device 102 as shown in FIG. 3. The method 700 begins in block 702, in which the computing device 102 receives a request for activity counter data from the analytics server 104. As described above, the analytics server 104 may poll each computing device 102 periodically (e.g., every fifteen minutes) for activity counter data. The computing device 102 may respond to the request for activity counter with an analytics reporting package or other technique with minimal performance impact to the computing device 102.

In block 704 the computing device 102 sends the analytics counter data to the analytics server 104. As described above, the analytics counter data may be embodied as any performance monitoring or resource management counter data that may be indicative of an active cache side channel attack. For example, the analytics counter data may be indicative of last-level cache (LLC) 206 occupancy, LLC 206 cache misses, memory bandwidth used, or other performance characteristics of the computing device 102. The analytics counter data may be generated by the resource manager 210 of the computing device 102 or, in some embodiments, performance counters of individual processor cores 202 of the computing device 102. The analytics counter data is illustratively applicable to the entire computing device 102 (i.e., to all processes executed by the computing device 102). In some embodiments, in block 706 the computing device 102 may also send analytics counter data for a group of primary applications executed by the computing device 102. As described above, the primary applications may be embodied as a group of processes, servers, or other applications that are expected to be executed by the computing device 102 and are known to be non-malicious. The resource manager 210 may generate analytics counter data for the primary applications.

In block 708 the computing device 102 determines whether to perform suspicious application activity detection. The computing device 102 may perform suspicious application activity detection when commanded by the analytics server 104. For example, the computing device 102 may receive a detection process that is transmitted or otherwise deployed from the analytics server 104. If the computing device 102 determines not to perform suspicious application detection, the method 700 loops back to block 702 to continue providing activity counter data to the analytics server 104. If the computing device 102 determines to perform suspicious application detection, the method 700 advances to block 710.

In block 710, the computing device 102 executes the detection process to identify suspicious levels of application activity that are indicative of a potential cache side channel attack. The computing device 102 may use any appropriate technique to identify potential cache side channel attacks. In some embodiments, in block 712, the computing device 102 may configure hardware cache counters on each logical processor of the processor 120 to record LLC 206 loads and LLC 206 load misses. The computing device 102 may configure a hardware monitoring system (e.g., a perf subsystem) to record a data sample every 10,000 LLC loads.

Suspicious application activity may include a higher than expected ratio of LLC load misses to LLC loads. For example, the measured ratio of LLC load misses to LLC loads may be compared to a predetermined threshold ratio. In block 714, the computing device 102 reports suspicious application activity to the analytics server 104. As described above, in some embodiments, the computing device 102 may report whether suspicious application activity was detected (e.g., whether the LLC load miss to LLC load ratio exceeded the threshold). Additionally or alternatively, the computing device 102 may report the data generated by the detection process (e.g., the LLC load miss data).

In block 716, the computing device 102 may perform one or more corrective actions to mitigate a potential cache side channel attack. The computing device 102 may perform the corrective action automatically (e.g., without further direction from the analytics server 104) or in response to a command from the analytics server 104. For example, as described above, the analytics server 104 may determine whether a particular suspicious application is whitelisted before commanding the computing device 102 to perform a corrective action. As described above, the particular corrective action to be taken may depend on one or more capabilities of the computing device 102, one or more security policies, or other factors. Additionally, as described above, multiple corrective actions may be combined.

In block 718, in some embodiments the computing device 102 may kill a process associated with the suspicious application or otherwise terminate a currently executing suspicious application. In block 720, in some embodiments the computing device 102 may delete an executable image or other files associated with the suspicious application. In block 722, in some embodiments the computing device 102 may reset, reboot, or otherwise restart. As described above, resetting the computing device 102 may cause the caches and other volatile memory of the computing device 102 to be reset and thus may defeat certain cache side channel attacks. In some embodiments, in block 724 the computing device 102 may restrict resource usage such as memory bandwidth or LLC 206 occupancy for a process associated with the suspicious application using the resource manager 210. As described above, restricting resource usage may prevent or reduce the severity of certain cache side-channel attacks, for example by preventing the malicious process from forcing the LLC 206 to be flushed and/or by reducing the rate that a malicious process can attempt to read unauthorized memory. After performing the corrective action, the method 700 loops back to block 702 to continue reporting analytics counter data to the analytics server 104.

It should be appreciated that, in some embodiments, the method 700 may be embodied as various instructions stored on a computer-readable media, which may be executed by the processor 120, the I/O subsystem 122, and/or other components of the computing device 102 to cause the computing device 102 to perform the method 700. The computer-readable media may be embodied as any type of media capable of being read by the computing device 102 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for exploit detection and correction, the computing device comprising: a core activity monitor to (i) receive activity data from a monitored computing device and (ii) determine whether suspicious core activity exists based on the activity data, wherein the suspicious core activity is indicative of a cache side channel attack; an application activity monitor to (i) cause a detection process of the monitored computing device based on one or more performance counters local to the monitored computing device in response to a determination that suspicious core activity exists and (ii) determine whether a suspicious application exists in response to a causing of the detection process, wherein the suspicious application is indicative of the cache side channel attack; and a corrective action manger to cause the monitored computing device to perform a corrective action in response to a determination that the suspicious application exists.

Example 2 includes the subject matter of Example 1, and wherein: the core activity monitor is further to poll the monitored computing device for the activity data, wherein to poll the monitored computing device comprises to wait a predetermined monitoring interval; wherein to receive the activity data comprises to receive the activity data in response to polling of the monitored computing device.

Example 3 includes the subject matter of any of Examples 1 and 2, and wherein the core activity monitor is further to select the monitored computing device from a plurality of monitored computing devices.

Example 4 includes the subject matter of any of Examples 1-3, and wherein: the application activity monitor is further to determine whether the suspicious application is included in a predetermined list of allowed applications in response to the determination that the suspicious application exists; wherein to cause the monitored computing device to perform the corrective action further comprises to cause the monitored computing device to perform the corrective action in response to a determination that the suspicious application is not included in the predetermined list of allowed applications.

Example 5 includes the subject matter of any of Examples 1-4, and wherein to cause the monitored computing device to perform the corrective action corrective action comprises to cause the monitored computing device to kill the suspicious application, to cause the monitored computing device to delete an image associated with the suspicious application, or to cause the monitored computing device to reset.

Example 6 includes the subject matter of any of Examples 1-5, and wherein to cause the monitored computing device to perform the corrective action corrective action comprises to cause the monitored computing device to restrict resource usage by the suspicious application using a resource manager of the managed computing device.

Example 7 includes the subject matter of any of Examples 1-6, and wherein to restrict the resource usage comprises to restrict cache occupancy by the suspicious application.

Example 8 includes the subject matter of any of Examples 1-7, and wherein to restrict the resource usage comprises to restrict memory bandwidth available to the suspicious application.

Example 9 includes the subject matter of any of Examples 1-8, and wherein: to receive the activity data comprises to receive last-level cache data from a resource manager of the managed computing device; and to determine whether the suspicious core activity exists comprises to compare cache misses of the activity data to a predetermined cache miss threshold.

Example 10 includes the subject matter of any of Examples 1-9, and wherein: to receive the activity data comprises to receive memory bandwidth data from a resource manager of the managed computing device; and to determine whether the suspicious core activity exists comprises to compare memory bandwidth usage of the activity data to a predetermined memory bandwidth threshold.

Example 11 includes the subject matter of any of Examples 1-10, and wherein: to receive the activity data comprises to receive first activity data for one or more primary applications of the managed computing device from a resource manager of the managed computing device and to receive second activity data for the managed computing device from the resource manager of the managed computing device; and to determine whether the suspicious core activity exists comprises to compare the first activity data to the second activity data.

Example 12 includes a computing device for exploit detection and correction, the computing device comprising: a core activity monitor to send activity data to an analytics server, wherein the activity data is generated by a resource manager of a processor of the computing device; an application activity monitor to (i) determine whether suspicious application activity exists based on performance counter data of the computing device in response to sending of the activity data, wherein the performance counter data is generated by one or more performance counters local to the processor of the computing device, and wherein the suspicious application activity is indicative of a cache side channel attack, and (ii) report whether the suspicious application activity exists to the analytics server in response a determination of whether suspicious application activity exists; and a corrective action manager to perform a corrective action in response to a determination that the suspicious application activity exists.

Example 13 includes the subject matter of Example 12, and wherein to determine whether the suspicious application activity exists comprises to execute a detection process to identify the suspicious application activity.

Example 14 includes the subject matter of any of Examples 12 and 13, and wherein: the application activity monitor is further to receive the detection process from the analytics server in response to sending of the activity data; and to execute the detection process comprises to execute the detection process in response to receipt of the detection process.

Example 15 includes the subject matter of any of Examples 12-14, and wherein to send the activity data comprises to send first activity data for one or more primary applications of the managed computing device and to send second activity data for the managed computing device.

Example 16 includes the subject matter of any of Examples 12-15, and wherein to determine whether the suspicious application activity exists comprises to: sample last-level cache loads and last-level cache load misses for each logical processor of the processor with one or more performance counters of the processor; determine a ratio of last-level cache load misses to last-level cache loads; and compare the ratio to a predetermined threshold ratio.

Example 17 includes the subject matter of any of Examples 12-16, and wherein to perform the corrective action corrective action comprises to kill a process associated with the suspicious application activity, to delete an image associated with the suspicious application activity, or to reset the computing device.

Example 18 includes the subject matter of any of Examples 12-17, and wherein to perform the corrective action corrective action comprises to restrict resource usage by a process associated with the suspicious application activity with the resource manager.

Example 19 includes the subject matter of any of Examples 12-18, and wherein to restrict the resource usage comprises to restrict cache occupancy by the process associated with the suspicious application activity.

Example 20 includes the subject matter of any of Examples 12-19, and wherein to restrict the resource usage comprises to restrict memory bandwidth available to the process associated with the suspicious application activity.

Example 21 includes the subject matter of any of Examples 12-20, and wherein to send the activity data comprises to send last-level cache data generated by the resource manager.

Example 22 includes the subject matter of any of Examples 12-21, and wherein to send the activity data comprises to send memory bandwidth data generated by the resource manager.

Example 23 includes a method for exploit detection and correction, the method comprising: receiving, by a computing device, activity data from a monitored computing device; determining, by the computing device, whether suspicious core activity exists based on the activity data, wherein the suspicious core activity is indicative of a cache side channel attack; causing, by the computing device, a detection process of the monitored computing device based on one or more performance counters local to the monitored computing device in response to determining that suspicious core activity exists; determining, by the computing device, whether a suspicious application exists in response to causing the detection process, wherein the suspicious application is indicative of the cache side channel attack; and causing, by the computing device, the monitored computing device to perform a corrective action in response to determining that the suspicious application exists.

Example 24 includes the subject matter of Example 23, and further comprising: polling, by the computing device, the monitored computing device for the activity data, wherein polling the monitored computing device comprises waiting a predetermined monitoring interval; wherein receiving the activity data comprises receiving the activity data in response to polling the monitored computing device.

Example 25 includes the subject matter of any of Examples 23 and 24, and further comprising selecting, by the computing device, the monitored computing device from a plurality of monitored computing devices.

Example 26 includes the subject matter of any of Examples 23-25, and further comprising: determining, by the computing device, whether the suspicious application is included in a predetermined list of allowed applications in response to determining that the suspicious application exists; wherein causing the monitored computing device to perform the corrective action further comprises causing the monitored computing device to perform the corrective action in response to determining that the suspicious application is not included in the predetermined list of allowed applications.

Example 27 includes the subject matter of any of Examples 23-26, and wherein causing the monitored computing device to perform the corrective action corrective action comprises causing the monitored computing device to kill the suspicious application, causing the monitored computing device to delete an image associated with the suspicious application, or causing the monitored computing device to reset.

Example 28 includes the subject matter of any of Examples 23-27, and wherein causing the monitored computing device to perform the corrective action corrective action comprises causing the monitored computing device to restrict resource usage by the suspicious application using a resource manager of the managed computing device.

Example 29 includes the subject matter of any of Examples 23-28, and wherein restricting the resource usage comprises restricting cache occupancy by the suspicious application.

Example 30 includes the subject matter of any of Examples 23-29, and wherein restricting the resource usage comprises restricting memory bandwidth available to the suspicious application.

Example 31 includes the subject matter of any of Examples 23-30, and wherein: receiving the activity data comprises receiving last-level cache data from a resource manager of the managed computing device; and determining whether the suspicious core activity exists comprises comparing cache misses of the activity data to a predetermined cache miss threshold.

Example 32 includes the subject matter of any of Examples 23-31, and wherein: receiving the activity data comprises receiving memory bandwidth data from a resource manager of the managed computing device; and determining whether the suspicious core activity exists comprises comparing memory bandwidth usage of the activity data to a predetermined memory bandwidth threshold.

Example 33 includes the subject matter of any of Examples 23-32, and wherein: receiving the activity data comprises receiving first activity data for one or more primary applications of the managed computing device from a resource manager of the managed computing device and receiving second activity data for the managed computing device from the resource manager of the managed computing device; and determining whether the suspicious core activity exists comprises comparing the first activity data to the second activity data.

Example 34 includes a method for exploit detection and correction, the method comprising: sending, by a computing device, activity data to an analytics server, wherein the activity data is generated by a resource manager of a processor of the computing device; determining, by the computing device, whether suspicious application activity exists based on performance counter data of the computing device in response to sending the activity data, wherein the performance counter data is generated by one or more performance counters local to the processor of the computing device, and wherein the suspicious application activity is indicative of a cache side channel attack; reporting, by the computing device, whether the suspicious application activity exists to the analytics server in response to determining whether suspicious application activity exists; and performing, by the computing device, a corrective action in response to determining that the suspicious application activity exists.

Example 35 includes the subject matter of Example 34, and wherein determining whether the suspicious application activity exists comprises executing a detection process to identify the suspicious application activity.

Example 36 includes the subject matter of any of Examples 34 and 35, and further comprising: receiving, by the computing device, the detection process from the analytics server in response to sending the activity data; wherein executing the detection process comprises executing the detection process in response to receiving the detection process.

Example 37 includes the subject matter of any of Examples 34-36, and wherein sending the activity data comprises sending first activity data for one or more primary applications of the managed computing device and sending second activity data for the managed computing device.

Example 38 includes the subject matter of any of Examples 34-37, and wherein determining whether the suspicious application activity exists comprises: sampling last-level cache loads and last-level cache load misses for each logical processor of the processor, using one or more performance counters of the processor; determining a ratio of last-level cache load misses to last-level cache loads; and comparing the ratio to a predetermined threshold ratio.

Example 39 includes the subject matter of any of Examples 34-38, and wherein performing the corrective action corrective action comprises killing a process associated with the suspicious application activity, deleting an image associated with the suspicious application activity, or resetting the computing device.

Example 40 includes the subject matter of any of Examples 34-39, and wherein performing the corrective action corrective action comprises restricting resource usage by a process associated with the suspicious application activity using the resource manager.

Example 41 includes the subject matter of any of Examples 34-40, and wherein restricting the resource usage comprises restricting cache occupancy by the process associated with the suspicious application activity.

Example 42 includes the subject matter of any of Examples 34-41, and wherein restricting the resource usage comprises restricting memory bandwidth available to the process associated with the suspicious application activity.

Example 43 includes the subject matter of any of Examples 34-42, and wherein sending the activity data comprises sending last-level cache data generated by the resource manager.

Example 44 includes the subject matter of any of Examples 34-43, and wherein sending the activity data comprises sending memory bandwidth data generated by the resource manager.

Example 45 includes one or more computer-readable storage media comprising a plurality of instructions stored thereon that, in response to being executed, cause a computing device to: receive activity data from a monitored computing device; determine whether suspicious core activity exists based on the activity data, wherein the suspicious core activity is indicative of a cache side channel attack; cause a detection process of the monitored computing device based on one or more performance counters local to the monitored computing device in response to determining that suspicious core activity exists; determine whether a suspicious application exists in response to causing the detection process, wherein the suspicious application is indicative of the cache side channel attack; and cause the monitored computing device to perform a corrective action in response to determining that the suspicious application exists.

Example 46 includes the subject matter of Example 45, and further comprising a plurality of instructions stored thereon that, in response to being executed, cause the computing device to: poll the monitored computing device for the activity data, wherein polling the monitored computing device comprises waiting a predetermined monitoring interval; wherein to receive the activity data comprises to receive the activity data in response to polling the monitored computing device.

Example 47 includes the subject matter of any of Examples 45 and 46, and further comprising a plurality of instructions stored thereon that, in response to being executed, cause the computing device to select the monitored computing device from a plurality of monitored computing devices.

Example 48 includes the subject matter of any of Examples 45-47, and further comprising a plurality of instructions stored thereon that, in response to being executed, cause the computing device to: determine whether the suspicious application is included in a predetermined list of allowed applications in response to determining that the suspicious application exists; wherein to cause the monitored computing device to perform the corrective action further comprises to cause the monitored computing device to perform the corrective action in response to determining that the suspicious application is not included in the predetermined list of allowed applications.

Example 49 includes the subject matter of any of Examples 45-48, and wherein to cause the monitored computing device to perform the corrective action corrective action comprises to cause the monitored computing device to kill the suspicious application, to cause the monitored computing device to delete an image associated with the suspicious application, or to cause the monitored computing device to reset.

Example 50 includes the subject matter of any of Examples 45-49, and wherein to cause the monitored computing device to perform the corrective action corrective action comprises to cause the monitored computing device to restrict resource usage by the suspicious application using a resource manager of the managed computing device.

Example 51 includes the subject matter of any of Examples 45-50, and wherein to restrict the resource usage comprises to restrict cache occupancy by the suspicious application.

Example 52 includes the subject matter of any of Examples 45-51, and wherein to restrict the resource usage comprises to restrict memory bandwidth available to the suspicious application.

Example 53 includes the subject matter of any of Examples 45-52, and wherein: to receive the activity data comprises to receive last-level cache data from a resource manager of the managed computing device; and to determine whether the suspicious core activity exists comprises to compare cache misses of the activity data to a predetermined cache miss threshold.

Example 54 includes the subject matter of any of Examples 45-53, and wherein: to receive the activity data comprises to receive memory bandwidth data from a resource manager of the managed computing device; and to determine whether the suspicious core activity exists comprises to compare memory bandwidth usage of the activity data to a predetermined memory bandwidth threshold.

Example 55 includes the subject matter of any of Examples 45-54, and wherein: to receive the activity data comprises to receive first activity data for one or more primary applications of the managed computing device from a resource manager of the managed computing device and to receive second activity data for the managed computing device from the resource manager of the managed computing device; and to determine whether the suspicious core activity exists comprises to compare the first activity data to the second activity data.

Example 56 includes one or more computer-readable storage media comprising a plurality of instructions stored thereon that, in response to being executed, cause a computing device to: send activity data to an analytics server, wherein the activity data is generated by a resource manager of a processor of the computing device; determine whether suspicious application activity exists based on performance counter data of the computing device in response to sending the activity data, wherein the performance counter data is generated by one or more performance counters local to the processor of the computing device, and wherein the suspicious application activity is indicative of a cache side channel attack; report whether the suspicious application activity exists to the analytics server in response to determining whether suspicious application activity exists; and perform a corrective action in response to determining that the suspicious application activity exists.

Example 57 includes the subject matter of Example 56, and wherein to determine whether the suspicious application activity exists comprises to execute a detection process to identify the suspicious application activity.

Example 58 includes the subject matter of any of Examples 56 and 57, and further comprising a plurality of instructions stored thereon that, in response to being executed, cause the computing device to: receive the detection process from the analytics server in response to sending the activity data; wherein to execute the detection process comprises to execute the detection process in response to receiving the detection process.

Example 59 includes the subject matter of any of Examples 56-58, and wherein to send the activity data comprises to send first activity data for one or more primary applications of the managed computing device and to send second activity data for the managed computing device.

Example 60 includes the subject matter of any of Examples 56-59, and wherein to determine whether the suspicious application activity exists comprises to: sample last-level cache loads and last-level cache load misses for each logical processor of the processor, using one or more performance counters of the processor; determine a ratio of last-level cache load misses to last-level cache loads; and compare the ratio to a predetermined threshold ratio.

Example 61 includes the subject matter of any of Examples 56-60, and wherein to perform the corrective action corrective action comprises to kill a process associated with the suspicious application activity, to delete an image associated with the suspicious application activity, or to reset the computing device.

Example 62 includes the subject matter of any of Examples 56-61, and wherein to perform the corrective action corrective action comprises to restrict resource usage by a process associated with the suspicious application activity using the resource manager.

Example 63 includes the subject matter of any of Examples 56-62, and wherein to restrict the resource usage comprises to restrict cache occupancy by the process associated with the suspicious application activity.

Example 64 includes the subject matter of any of Examples 56-63, and wherein to restrict the resource usage comprises to restrict memory bandwidth available to the process associated with the suspicious application activity.

Example 65 includes the subject matter of any of Examples 56-64, and wherein to send the activity data comprises to send last-level cache data generated by the resource manager.

Example 66 includes the subject matter of any of Examples 56-65, and wherein to send the activity data comprises to send memory bandwidth data generated by the resource manager.

The invention claimed is:
1. A computing device for exploit detection and correction, the computing device comprising:

a hardware processor; and one or more memory devices having stored therein a plurality of instructions that, when executed by the hardware processor, cause the computing device to establish:
- a core activity monitor to (i) receive activity data from a remote monitored computing device and (ii) determine whether suspicious core activity exists based on the activity data, wherein the suspicious core activity is indicative of a cache side channel attack;
- an application activity monitor to (i) cause execution of a detection process by the remote monitored computing device in response to a determination that suspicious core activity exists, wherein the detection process is based on one or more performance counters local to the monitored computing device, and (ii) determine whether a suspicious application exists in response to a causing of execution of the detection process, wherein the suspicious application is indicative of the cache side channel attack; and
- a corrective action manager to cause the monitored computing device to perform a corrective action in response to a determination that the suspicious application exists.

2. The computing device of claim 1, wherein:
the core activity monitor is further to poll the monitored computing device for the activity data, wherein to poll the monitored computing device comprises to wait a predetermined monitoring interval;
wherein to receive the activity data comprises to receive the activity data in response to polling of the monitored computing device.

3. The computing device of claim 1, wherein:
the application activity monitor is further to determine whether the suspicious application is included in a predetermined list of allowed applications in response to the determination that the suspicious application exists;
wherein to cause the monitored computing device to perform the corrective action further comprises to cause the monitored computing device to perform the corrective action in response to a determination that the suspicious application is not included in the predetermined list of allowed applications.

4. The computing device of claim 1, wherein:
to receive the activity data comprises to receive last-level cache data from a resource manager of the monitored computing device; and
to determine whether the suspicious core activity exists comprises to compare cache misses of the activity data to a predetermined cache miss threshold.

5. The computing device of claim 1, wherein:
to receive the activity data comprises to receive memory bandwidth data from a resource manager of the monitored computing device; and
to determine whether the suspicious core activity exists comprises to compare memory bandwidth usage of the activity data to a predetermined memory bandwidth threshold.

6. The computing device of claim 1, wherein:
to receive the activity data comprises to receive first activity data for one or more primary applications of the monitored computing device from a resource manager of the monitored computing device and to receive second activity data for the monitored computing device from the resource manager of the monitored computing device; and
to determine whether the suspicious core activity exists comprises to compare the first activity data to the second activity data.

7. One or more non-transitory, computer-readable storage media comprising a plurality of instructions stored thereon that, in response to being executed, cause a computing device to:
- receive activity data from a remote monitored computing device;
- determine whether suspicious core activity exists based on the activity data, wherein the suspicious core activity is indicative of a cache side channel attack;
- cause execution of a detection process by the remote monitored computing device in response to determining that suspicious core activity exists, wherein the detection process is based on one or more performance counters local to the monitored computing device;
- determine whether a suspicious application exists in response to causing execution of the detection process, wherein the suspicious application is indicative of the cache side channel attack; and
- cause the monitored computing device to perform a corrective action in response to determining that the suspicious application exists.

8. The one or more non-transitory, computer-readable storage media of claim 7, further comprising a plurality of instructions stored thereon that, in response to being executed, cause the computing device to:
poll the monitored computing device for the activity data, wherein polling the monitored computing device comprises waiting a predetermined monitoring interval;
wherein to receive the activity data comprises to receive the activity data in response to polling the monitored computing device.

9. The one or more non-transitory, computer-readable storage media of claim 7, wherein:
to receive the activity data comprises to receive last-level cache data from a resource manager of the monitored computing device; and
to determine whether the suspicious core activity exists comprises to compare cache misses of the activity data to a predetermined cache miss threshold.

10. The one or more non-transitory, computer-readable storage media of claim 7, wherein:
to receive the activity data comprises to receive memory bandwidth data from a resource manager of the monitored computing device; and
to determine whether the suspicious core activity exists comprises to compare memory bandwidth usage of the activity data to a predetermined memory bandwidth threshold.

11. The one or more non-transitory, computer-readable storage media of claim 7, wherein:
to receive the activity data comprises to receive first activity data for one or more primary applications of the monitored computing device from a resource manager of the monitored computing device and to receive second activity data for the monitored computing device from the resource manager of the monitored computing device; and
to determine whether the suspicious core activity exists comprises to compare the first activity data to the second activity data.

12. A computing device for exploit detection and correction, the computing device comprising:
a hardware processor comprising an uncore and one or more processor cores; and one or more memory devices having stored therein a plurality of instructions that, when executed by the hardware processor, cause the computing device to establish:
- a core activity monitor to send activity data to an analytics server, wherein the activity data is generated by a resource manager of the uncore of the hardware processor of the computing device;
- an application activity monitor to (i) determine whether suspicious application activity exists based on performance counter data of the computing device in response to sending of the activity data, wherein the performance counter data is generated by one or more performance counters local to a processor core of the hardware processor of the computing device, and wherein the suspicious application activity is indicative of a cache side channel attack, and (ii) report whether the suspicious application activity exists to the analytics server in response to a determination of whether suspicious application activity exists; and
- a corrective action manager to perform a corrective action in response to a determination that the suspicious application activity exists.

13. The computing device of claim 12, wherein to determine whether the suspicious application activity exists comprises to execute a detection process to identify the suspicious application activity.

14. The computing device of claim 13, wherein:
the application activity monitor is further to receive the detection process from the analytics server in response to sending of the activity data; and
to execute the detection process comprises to execute the detection process in response to receipt of the detection process.

15. The computing device of claim 12, wherein to determine whether the suspicious application activity exists comprises to:
sample last-level cache loads and last-level cache load misses for each logical processor of the processor with one or more performance counters of the processor;
determine a ratio of last-level cache load misses to last-level cache loads; and
compare the ratio to a predetermined threshold ratio.

16. The computing device of claim 12, wherein to perform the corrective action comprises to kill a process associated with the suspicious application activity, to delete an image associated with the suspicious application activity, or to reset the computing device.

17. The computing device of claim 12, wherein to perform the corrective action comprises to restrict resource usage by a process associated with the suspicious application activity with the resource manager.

18. The computing device of claim 17, wherein to restrict the resource usage comprises to restrict cache occupancy by the process associated with the suspicious application activity.

19. The computing device of claim 17, wherein to restrict the resource usage comprises to restrict memory bandwidth available to the process associated with the suspicious application activity.

20. One or more non-transitory, computer-readable storage media comprising a plurality of instructions stored thereon that, in response to being executed, cause a computing device to:
send activity data to an analytics server, wherein the activity data is generated by a resource manager of an uncore of a processor of the computing device;
determine whether suspicious application activity exists based on performance counter data of the computing device in response to sending the activity data, wherein the performance counter data is generated by one or more performance counters local to a processor core of the processor of the computing device, and wherein the suspicious application activity is indicative of a cache side channel attack;
report whether the suspicious application activity exists to the analytics server in response to determining whether suspicious application activity exists; and
perform a corrective action in response to determining that the suspicious application activity exists.

21. The one or more non-transitory, computer-readable storage media of claim 20, wherein to determine whether the suspicious application activity exists comprises to:
sample last-level cache loads and last-level cache load misses for each logical processor of the processor, using one or more performance counters of the processor;
determine a ratio of last-level cache load misses to last-level cache loads; and
compare the ratio to a predetermined threshold ratio.

22. The one or more non-transitory, computer-readable storage media of claim 20, wherein to perform the corrective action comprises to kill a process associated with the suspicious application activity, to delete an image associated with the suspicious application activity, or to reset the computing device.

23. The one or more non-transitory, computer-readable storage media of claim 20, wherein to perform the corrective action comprises to restrict resource usage by a process associated with the suspicious application activity using the resource manager.

24. The one or more non-transitory, computer-readable storage media of claim 23, wherein to restrict the resource usage comprises to restrict cache occupancy by the process associated with the suspicious application activity.

25. The one or more non-transitory, computer-readable storage media of claim 23, wherein to restrict the resource usage comprises to restrict memory bandwidth available to the process associated with the suspicious application activity.

* * * * *